(12) United States Patent
Matsuyama et al.

(10) Patent No.: US 8,333,006 B2
(45) Date of Patent: Dec. 18, 2012

(54) METHOD FOR REMOVING A CRACK IN AN ELECTROMECHANICAL ROTOR

(75) Inventors: Koji Matsuyama, Yokohama (JP); Hideki Chiba, Yokohama (JP); Hiromichi Ito, Tokyo (JP); Yomei Yoshioka, Yokohama (JP); Kazuhiro Saito, Yokohama (JP); Yasuo Kabata, Yokohama (JP); Ryoji Nagano, Yokohama (JP); Hiroaki Koinuma, Yokohama (JP); Kaname Hirai, Yokohama (JP); Toshio Kitajima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1111 days.

(21) Appl. No.: 11/645,507

(22) Filed: Dec. 27, 2006

(65) Prior Publication Data

US 2007/0169334 A1  Jul. 26, 2007

(30) Foreign Application Priority Data

Dec. 28, 2005 (JP) ................. P2005-380344

(51) Int. Cl.
*H02K 15/02* (2006.01)
*B23P 6/04* (2006.01)

(52) U.S. Cl. ............... 29/598; 29/402.06; 29/402.11; 29/558; 310/156.08

(58) Field of Classification Search ............... 29/598, 29/596, 402.06, 402.11, 558; 310/156.08, 310/261.1, 270
See application file for complete search history.

(56) References Cited

U.S. PATENT DOCUMENTS

| | | | |
|---|---|---|---|
| 2,252,986 A | * | 8/1941 | Scott .............. 29/402.11 X |
| 5,883,456 A | * | 3/1999 | Gardner et al. .......... 310/270 |
| 6,849,972 B1 | | 2/2005 | Barnes et al. |

FOREIGN PATENT DOCUMENTS

| | | | | |
|---|---|---|---|---|
| JP | 03243261 A | * | 10/1991 | ........... 29/402.11 |
| JP | 4-29304 | | 5/1992 | |
| JP | 5-74304 | | 10/1993 | |
| JP | 7-40774 | | 5/1995 | |
| JP | 7-44802 | | 5/1995 | |

* cited by examiner

*Primary Examiner* — A. Dexter Tugbang
(74) *Attorney, Agent, or Firm* — Finnegan, Henderson, Farabow, Garrett & Dunner, L.L.P.

(57) ABSTRACT

A method for removing a crack in an electromechanical rotor, including: forming a plurality of slots on a periphery of a core portion of an electromechanical rotor along an axial direction thereof; inserting coils into the slots, respectively; forming a plurality of wedges for maintaining the coils in the slots, respectively; and forming a cut hole at at least a part of the core portion from an outer surface of the core portion toward the side of a center axis thereof so as to contain a crack along a circumferential direction thereof.

13 Claims, 8 Drawing Sheets

PRIOR ART

PRIOR ART

PRIOR ART

PRIOR ART

METHOD FOR REMOVING A CRACK IN AN ELECTROMECHANICAL ROTOR

CROSS-REFERENCE TO RELATED APPLICATIONS

This application is based upon and claims the benefit of priority from the prior Japanese Patent Application No. 2005-380344 filed on Dec. 28, 2005; the entire contents of which are incorporated herein by reference.

BACKGROUND

1. Field of the Invention

The present invention relates to a method for removing a crack in an electromechanical rotor, an electromechanical rotor and a rotary electrical machine where many slots, in which coils and wedges are inserted at the corresponding bottom portions and the corresponding top portions thereof, are provided at the periphery of the rotor core portion thereof along the axial direction so that in the slots, the coils can be fixed in the corresponding wedges.

2. Description of the Related Art

A rotor 300 of a conventional turbine generator will be described with reference to FIGS. 8-14.

FIG. 8 is a cross sectional view schematically showing a portion of the conventional rotor 300, and FIG. 9 is a partially cut away plan view schematically showing the rotor 300, perpendicular to the axial direction thereof. FIG. 10 is a perspective view schematically showing the fabrication state between a slot 303 and a wedge 305. FIG. 11 is a plan view showing a rotor shaft 301 under deformation. FIG. 12 is a perspective view showing the conventional rotor 300 of the turbine generator with cracks created at the rotor dove tail thereof. FIGS. 13 and 14 are plan views of the conventional rotor 300 for explaining a conventional removing method for the cracks created at the rotor dove tail thereof.

As shown in FIGS. 8-10, the rotor 300 of the turbine generator includes the rotor shaft 301 and the core portion 302 formed integral with the rotor shaft 301. Then, many slots 303 are provided at the periphery of the core portion 302 thereof along the axial direction. Coils 304 are inserted into the bottom portions of the corresponding slots 303. Wedges 305 are provided on the corresponding coils 304 via corresponding insulating blocks 306 so as to be inserted into the ditches formed at the upper portions of the slots 303, respectively. In this case, the coils 304 can not be dropped off from in the corresponding slots 303 if the centrifugal force affects the slots 303 (coils 304) when the rotor shaft 301 is rotated.

The wedges 305 may be formed in any shape, but normally formed in dove tail as shown in FIG. 10. The wedges 305 may be formed in T-shape, Christmas tree-shape and the like. Since each slot 303 has some wedges 305, contacting edges 308 are formed between the adjacent wedges 305 at the corresponding contacting surfaces 307 between the wedges 305 and the slots 303. Surface pressures, originated from the centrifugal force, affect the contacting edges 308 and relative slips ±δ occur between the slots 303 (the core portion 302 of the rotor 300) and the wedges 305 when the core portion 302 of the rotor 303 is rotated under the condition that the core portion 302 is curved due to the weight thereof or the bending vibration thereof by the curvature of "r", as shown in FIG. 11. In this case, relatively large tensile stresses and compressive stresses may occur and concentrated at the sides of the core portion 302 of the contacting edges 308 so that some fretting damages occur at the stress concentrating areas of the contacting edges 308 and thus, some cracks occur at the same areas.

As shown in FIG. 11, supposed that the radius of the core portion 302 of the rotor 303 is defined as "$r_0$" and the length of the wedge 305 is defined as "L", the core portion 302 is expanded and extracted at the wedge edge by the amount of δ which can be represented by the equation (1) when the core portion 302 is shifted to the upper point A or lower point B. In this case, since the wedge 305 is provided along the axial direction of the rotor shaft 301, the wedge 305 can not be expanded and extracted by itself. Therefore, the relative slip of 2δ occurs at at least one of the contacting edges 308 between the corresponding wedges 305 and the core portion 302 every one rotation of a rotor shaft 301.

$$\delta = r_0 \cdot L / 2r \tag{1}$$

In this way, if the relative slip occurs at the contacting edge 308 under the condition that a relatively large surface pressure is applied to the contacting edge 308, the fretting damage occurs at the contacting edge 308 so that a crack 309 may occur at the contacting surface 307.

Moreover, the crack 309, which occurs at the contacting surface 307 of the core portion 302 of the rotor 300, may be grown by the bending stress generated when the core portion 302 is rotated under the condition that the core portion 302 is curved by the weight thereof or the bending vibration, the thermal stress due to the temperature difference between the outer side and the inner side of the core portion 302 at the operation of the turbine generator, or the residual stress in the core portion 302. Therefore, such a technique as removing the crack 309 created at the contacting surface 307 of the core portion 302 at the scheduled outage is disclosed (e.g., refer to U.S. Pat. No. 6,849,972).

With the conventional crack removing method as disclosed in Patent document No. 1, the surrounding area of the crack 309 is defined in dependent on the condition and the size of the crack 309, and removed, as shown in FIGS. 13 and 14. The surrounding area is turned into a crack removed area 310 after the removal.

Moreover, it is disclosed that some ditches for stress relaxation are formed at the corresponding contacting edge 308 in the side of the core portion 302 so that the tensile stress and the compressive stress due to the relative slip between the corresponding wedge 305 and the core portion 302 of the rotor 300 can not be concentrated onto the corresponding contacting edge 308 (e.g., refer to JP-B 4-29304 (KOKOKU)). In addition, some techniques as mitigating or preventing the fretting fatigue at the contacting surface 307 in the side of the core portion 302 are disclosed (e.g., refer to JP-B 5-74304(KOKOKU), JP-B 7-40774(KOKOKU) and JP-B 7-44802(KOKOKU)).

With the conventional technique where the crack 309 created at the contacting surface 307 in the side of the core portion 302 of the rotor 300 is removed, the fine processing for the minute space inside the slot 303 is required so that the processing efficiency is deteriorated. With the conventional technique relaxing the concentration of the tensile stress and the compressive stress at the contacting edge 308 due to the relative slip between the wedge 305 and the core portion 302 or mitigating or preventing the fretting fatigue at the contacting surface 307 in the side of the core portion 302, some cracks due to the fretting fatigue may be mitigated or prevented, but no crack can be removed and the crack growth can not be prevented.

SUMMARY

It is an object of the present invention, in view of the above-described problems, to provide a method for removing a crack in an electromechanical rotor where some cracks created at the contacting surface between the core portion and the corresponding wedge can be easily removed by processing the core portion from the outside. It is also an object of the present invention to provide an electromechanical rotor and a rotary electrical machine where some cracks are removed by the crack removing method.

In order to achieve the above object, an aspect of the present invention relates to a method for removing a crack in an electromechanical rotor includes: forming a plurality of slots on a periphery of a core portion of an electromechanical rotor along an axial direction thereof; inserting coils into the slots, respectively; forming a plurality of wedges for maintaining the coils in the slots, respectively; and forming a cut hole at at least a part of the core portion from an outer surface of the core portion toward the side of a center axis thereof so as to contain a crack along a circumferential direction thereof.

Moreover, according to the aspect of the removing method of the present invention, an electromechanical rotor including a core portion from which a crack, formed at the core portion, is removed, can be provided. In addition, a rotary electrical machine including a core portion from which a crack, formed at the core portion, is removed, can be provided.

DETAILED DESCRIPTION

Hereinafter, embodiments of the present invention will be described with reference to the drawings. The drawings, though referred to in describing the embodiments of the present invention, are provided only for an illustrative purpose and in no way limit the present invention.

First Embodiment

Figure 1:
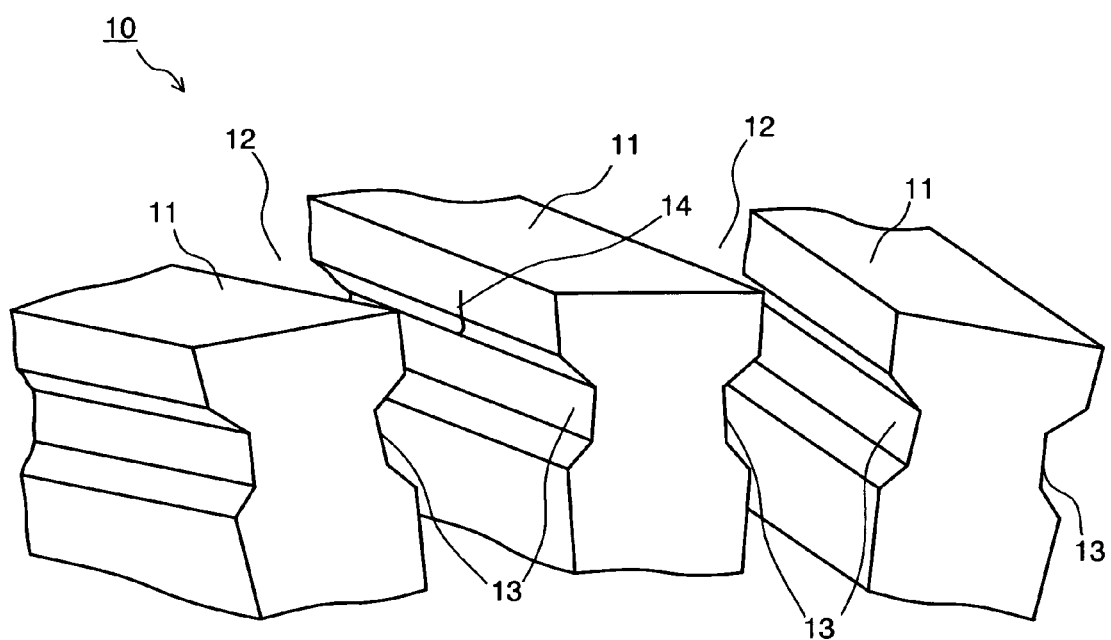
FIG. 1 is a perspective view schematically showing the core portion of an electromechanical rotor according to a first embodiment of the present invention when a crack occurs.
Figure 2A:
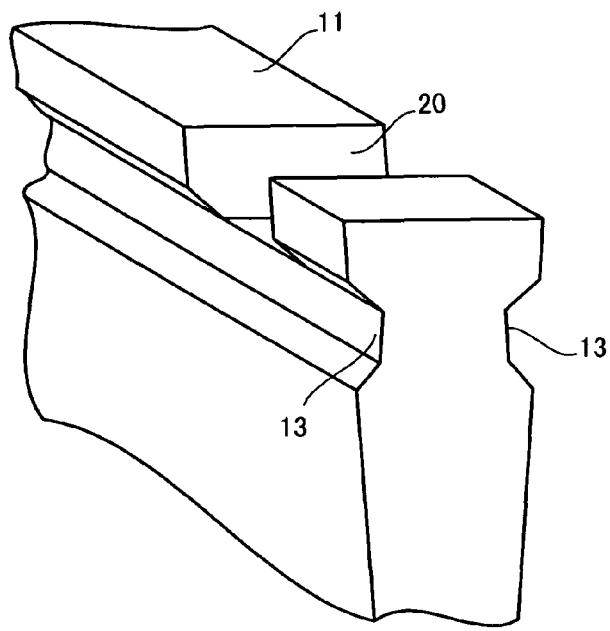
FIGS. 2A and 2B are also a perspective view schematically showing the core portion of the electromechanical rotor according to the first embodiment of the present invention after the crack is removed.
Figure 2B:
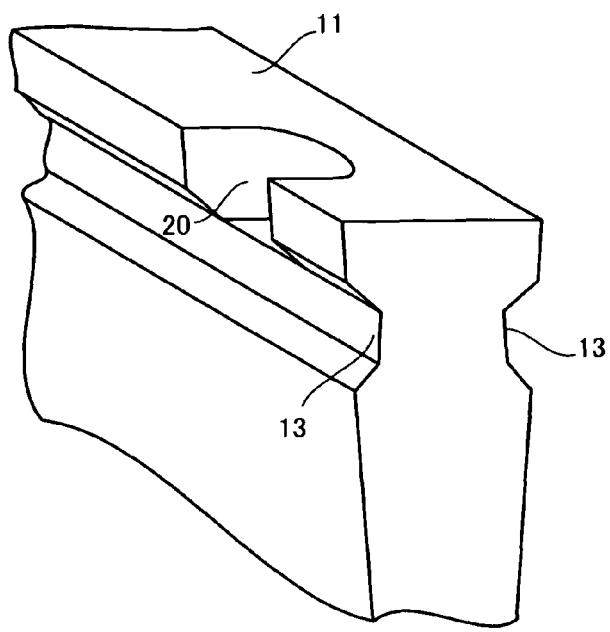
Figure 3:
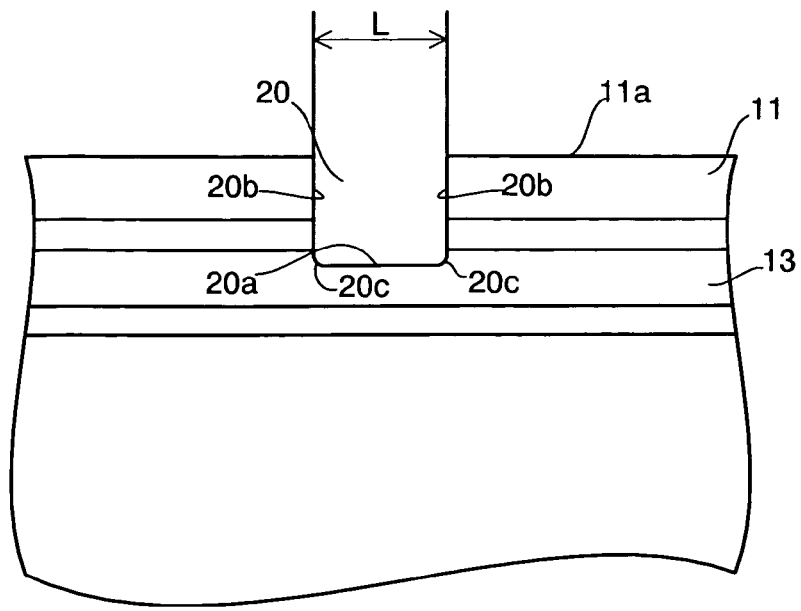
FIG. 3 is a plan view schematically showing the side of the core portion of the electromechanical rotor shown in FIG. 2A.

The first embodiment according to the present invention will be described hereinafter, with reference to FIGS. 1-3. FIG. 1 is a perspective view schematically showing the core portion 11 of an electromechanical rotor 10 according to the first embodiment when a crack 14 occurs. FIGS. 2A and 2B are also a perspective view schematically showing the core portion 11 of the electromechanical rotor 10 according to the first embodiment after the crack 14 is removed. FIG. 3 is a plan view schematically showing the side of the core portion 11 of the electromechanical rotor 10 shown in FIG. 2.

As shown in FIG. 1, the electromechanical rotor 10 includes a plurality of core portions 11 which are arranged subsequently by a given pitch in the circumferential direction and radially toward the center axis. Then, a plurality of slots 12 are provided in the corresponding spaces between the adjacent core portions 11 along the axial direction. Each slot 12 contains a coil and a wedge provided on the outer side of the coil in the radial direction via an insulating layer. The wedge can prevent the coil from being dropped off from in the corresponding slot in the radial direction if the centrifugal force affects the slot when the electromechanical rotor 10 is rotated. The wedge may be formed in dove tail-shape, T-shape, Christmas tree-shape and the like.

Then, since a plurality of ditches 13 are formed at each slot 12 and a plurality of wedges are provided in the corresponding ditches, the contacting edges are formed between the adjacent wedges at the corresponding contacting surfaces between the wedges and the slots 12. As shown in FIG. 1, surface pressures, originated from the centrifugal force, affect the contacting edges, respectively, and relative slips occur between the slots 12 (the core portions 11) and the wedges, respectively, when the core portions 11 of the electromechanical rotor 10 are rotated under the condition that the core portions 11 are curved due to the weight thereof or the bending vibration thereof. In this case, relatively large tensile stresses and compressive stresses may occur and concentrated at the sides of the core portions 11 of the contacting edges so that a fretting damage occurs at the stress concentrating area of the corresponding core portion 11 and thus, a crack 14 occurs at the same area.

Then, the removing method for the crack 14 will be described with reference to FIGS. 2A, 2B and 3.

As shown in FIGS. 2A and 3, a cut hole 20 is formed at the corresponding core portion 11 from the outer surface 11a thereof toward the side of the center axis thereof so as to contain a crack 14 along the circumferential direction. Since the cut hole 20 is formed so as to contain the crack 14, the crack 14 can be removed through the formation of the cut hole 20. The cut hole processing can be carried out by means of processing machine such as drilling machine. In FIG. 2A, although the cut hole 20 is formed over the periphery of the core portion 11 along the circumferential direction, the cut hole 20 may be formed at a portion of the periphery of the core portion 11. In other words, in this embodiment, only if the cut hole 20 is partially formed so as to contain the crack 20, the crack 20 can be removed.

The length "L" of the cut hole 20 along the axial direction is preferably set within 3 to 20 mm. The depth of the cut hole 20 is determined in dependent on the size and the shape of the crack 14 created at the core portion 11 of the electromechanical rotor 10. Since the cut hole 20 is formed from the outer surface 11a, at least one end of the cut hole 20 is opened.

Herein, the bottom surface 20a of the cut hole 20 is subject to the bending stress when the core portions 11 are rotated under the condition that the core portions 11 are curved by the weight thereof or the bending vibration, the thermal stress due to the temperature difference between the outer side and the inner side of the core portion 11, the high frequency cyclic fatigue originated from the axial stress such as a residual stress in the core portion and low frequency cyclic fatigue originated from the fluctuation of the centrifugal force against the slot 12 at the start-and-stop control. The upper portion of the slot 12 is subject to the low frequency cyclic fatigue originated from the fluctuation of the centrifugal force against the slot 12 at the start-and-stop control.

In this case, it is desired that the length "L" of the cut hole 20 along the axial direction is set to 3 mm or over, as described above. If the length "L" is set below 3 mm, the stress concentration coefficient of the bottom surface 20a of the cut hole 20 becomes large so that the fatigue strength of the core portion is lowered. It is desired that the length "L" of the cut hole 20 along the axial direction is set to 20 mm or below, as described above. If the length "L" is set beyond 20 mm, the contacting pressure between the core portion 11 of the electromechanical rotor 10 and the corresponding wedge(s) in the vicinity of the cut hole 20 becomes large and the stress for the core portion 11 and the corresponding wedge(s), originated from the stress concentration at the cut hole 20, become large, so that the fatigue strength of the core portion may be lowered.

In the formation of the cut hole 20, the bottom surface 20a may be orthogonal to the side surfaces 20b so as to form the respective rectangular edges at the contacting edges 20c, but preferably form the respective curved edges at the contacting edges 20c by the curvature "R", as shown in FIG. 3. The curved contacting edges 20c can reduce the stress concentration thereat so as to prevent the reduction of the fatigue strength of the core portion 11. It is desired that the curvature "R" of the contacting edges is set to 1.5 mm or over. If the curvature "R" is set below 1.5 mm, the stress concentration at the bottom surface 20a can not be reduced so that the fatigue strength of the core portion 11 is also reduced.

According to the removing method for the crack 14 created at the core portion 11 as described above, since the crack 14 can be removed from the outer surface of the core portion 11, the crack 14 can be easily removed so that the operationality of the crack removing can be enhanced. In this case, since the crack 14 can be removed perfectly, the reliability of the core portion 11 of the electromechanical rotor 10 can be maintained at high degree after the crack is removed. If the length "L" of the cut hole 20 is set larger, the processing condition (depth) toward the center axis can be easily recognized by means of nondestructive inspection.

If the core portion 11 of the electromechanical rotor 10 is balanced by means of a balancing plug for vibration control provided at the core portion 11, the core portion 11 can be appropriately balanced in weight even though the cut hole 20 is formed at the core portion 11.

Second Embodiment

A second embodiment according to the present invention will be described with reference to FIG. 4. In this embodiment, the length "L" of the cut hole 20 is set within 1 to 20 mm. Since the embodiment of the length "L" being set within 3 to 20 mm is described in the first embodiment, the embodiment of the length "L" being set to not less than 1 mm and less than 3 mm will be described.

Figure 4:
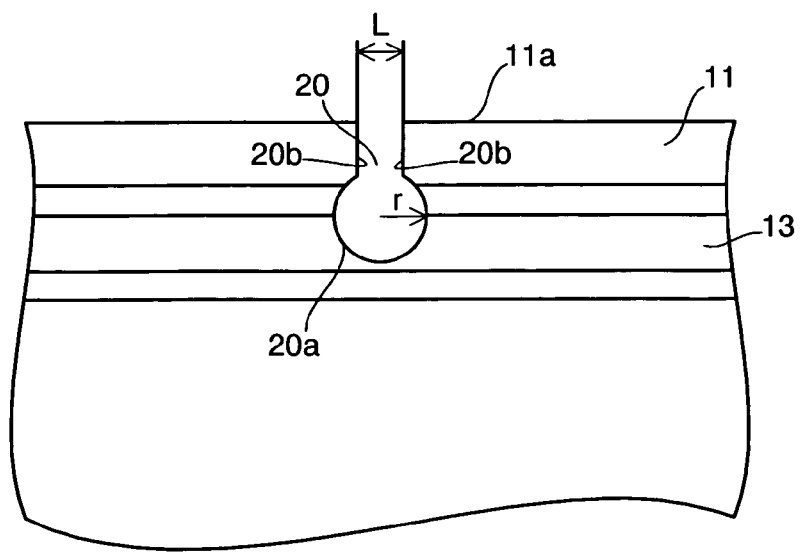
FIG. 4 is a plan view schematically showing the side of the core portion of an electromechanical rotor according to a second embodiment of the present invention when a crack is removed.

FIG. 4 is a plan view schematically showing the side of the core portion 11 of the electromechanical rotor 10 when the crack 14 is removed. The same reference numerals are imparted to like or corresponding components throughout the drawings of the present application. In this point of view, the explanation for like or corresponding components will be omitted.

As shown in FIG. 4, when the length "L" of the cut hole 20 along the axial direction is set to not less than 1 mm and less than 3 mm, the contacting edges between the bottom surface 20a and the side surfaces 20b of the cut hole 20 are processed so that the curvature radius "r" of the contacting edges is set to 1.5 mm or over. In this case, since the length "L" of the cut hole 20 along the axial direction is set to less than 3 mm, the shape of the bottom surface 20a of the cut hole 20 becomes circle. Therefore, the cut hole 20 is formed in keyhole shape entirely.

In the case that the length "L" of the cut hole 20 along the axial direction is set to not less than 1 mm and less than 3 mm, since the curvature radius "r" of the contacting edges is set to 1.5 mm or over, the stress for the bottom surface 20a of the cut hole 20 can be reduced so that the fatigue strength can be developed.

According to the removing method for the crack 14 created at the core portion 11 as described above, since the crack 14 can be removed from the outer surface of the core portion 11, the crack 14 can be easily removed so that the operationality of the crack removing can be enhanced.

In the case that only the small crack 14 is formed, if the cut hole 20 with the length "L" of not less than 1 mm and less than 3 mm is formed so as to contain the crack 14, the crack 14 can be removed under the condition that the stress concentration coefficient for the bottom surface 20a of the cut hole 20 can be reduced and thus, the fatigue strength can be developed.

In this embodiment, if the core portion 11 of the rotor 10 is balanced by means of a balancing plug for vibration control provided at the core portion 11, the core portion 11 can be appropriately balanced in weight even though the cut hole 20 is formed at the core portion 11.

Third Embodiment

A third embodiment according to the present invention will be described with reference to FIGS. 5-7.

In this embodiment, a filling member is adhered into the cut hole 20 formed in the first embodiment and the second embodiment.

Figure 5:
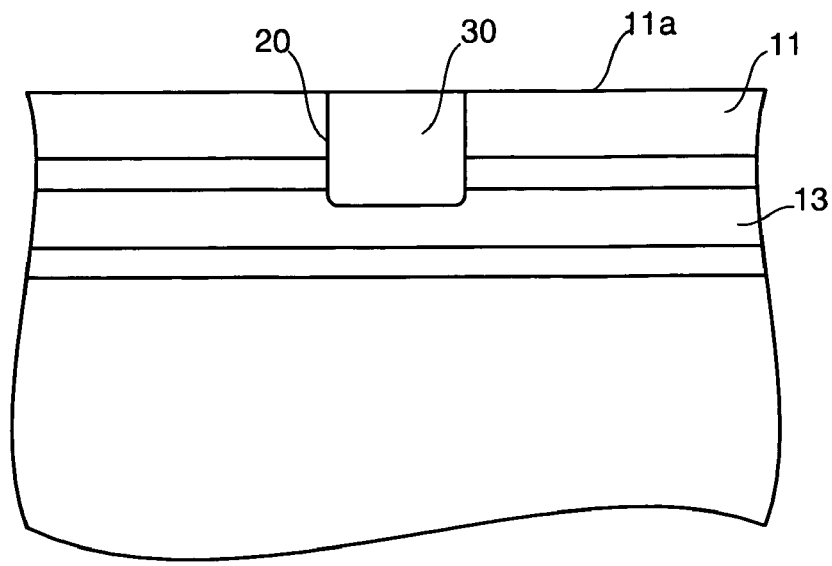
FIG. 5 is also a plan view schematically showing the side of the core portion of the electromechanical rotor in the first embodiment when a filling member is adhered into a cut hole formed at the core portion.

FIG. 5 is plan view schematically showing the side of the core portion 11 of the electromechanical rotor 10 in the first embodiment when the filling member 30 is adhered into the cut hole 20 formed at the core portion 11. FIG. 6 is also a plan view schematically showing the side of the core portion 11 of the electromechanical rotor 10 in the second embodiment when the filling member 40 is adhered into the cut hole 20 formed at the core portion 11. FIG. 7 is also a plan view schematically showing the side of the core portion 11 of the electromechanical rotor 10 when the filling member 50 is adhered into the cut hole 20 with a different shape from the first and second embodiments.

Figure 6:
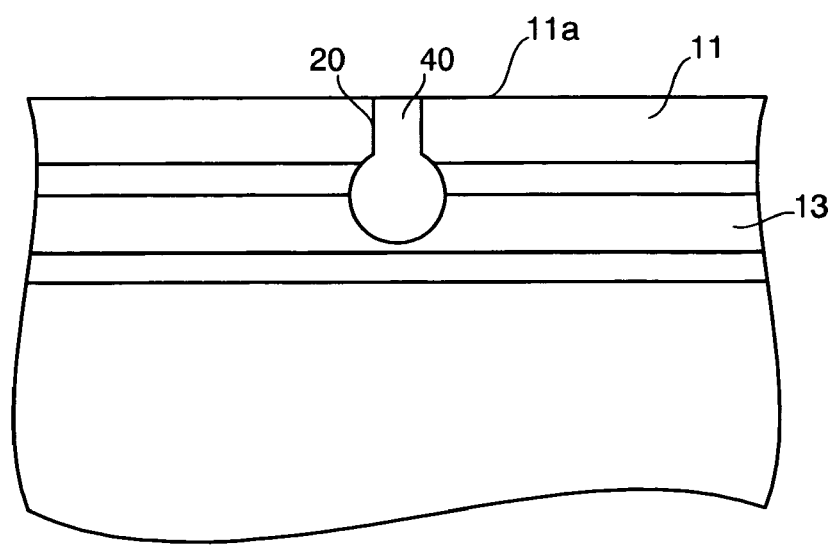
FIG. 6 is also a plan view schematically showing the side of the core portion of the electromechanical rotor in the second embodiment when a filling member is adhered into a cut hole formed at the core portion.
Figure 7:
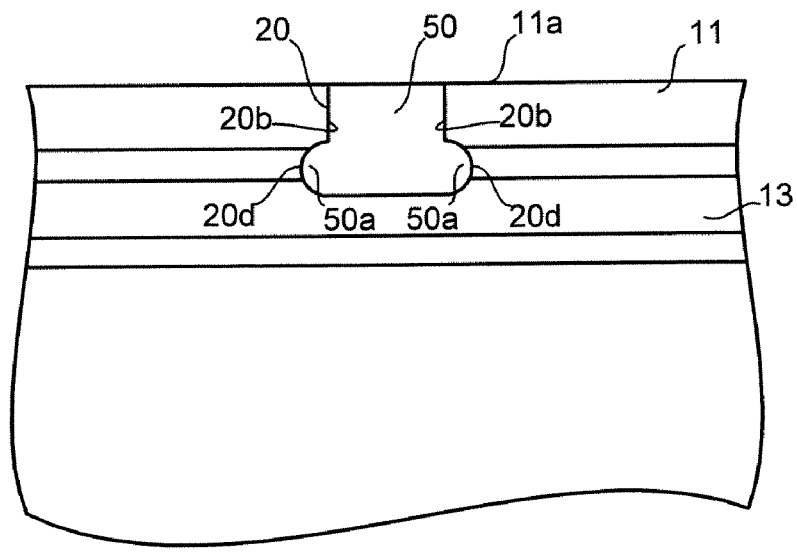
FIG. 7 is also a plan view schematically showing the side of the core portion of the electromechanical rotor when a filling member is adhered into another cut hole formed at the core portion.
Figure 8:
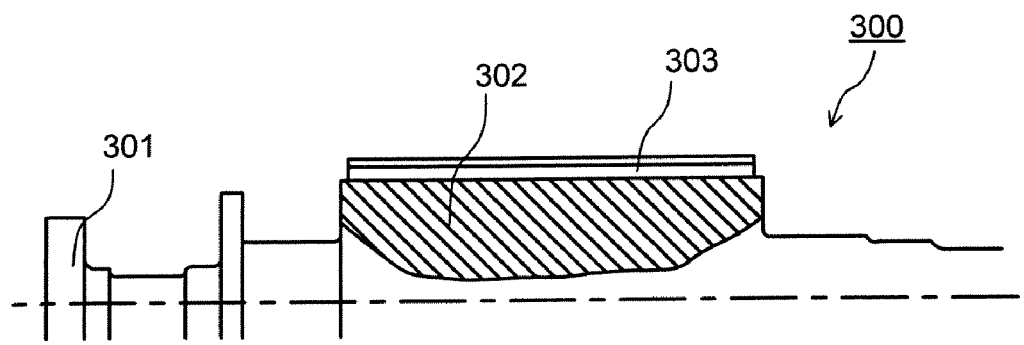
FIG. 8 is a cross sectional view schematically showing a portion of a rotor of a conventional turbine generator.
Figure 9:
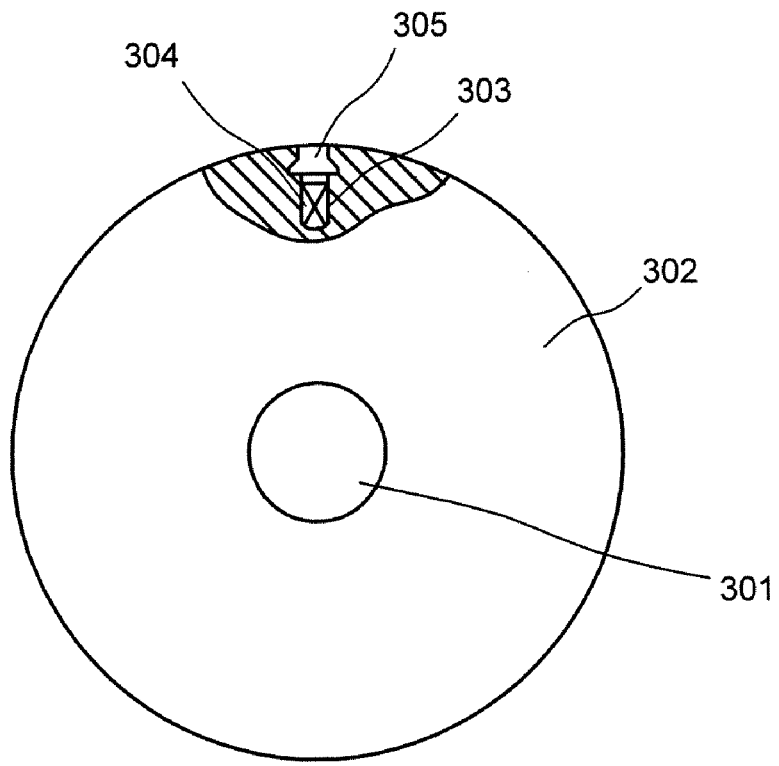
FIG. 9 is a partially cut away plan view schematically showing the rotor shown in FIG. 8
Figure 10:
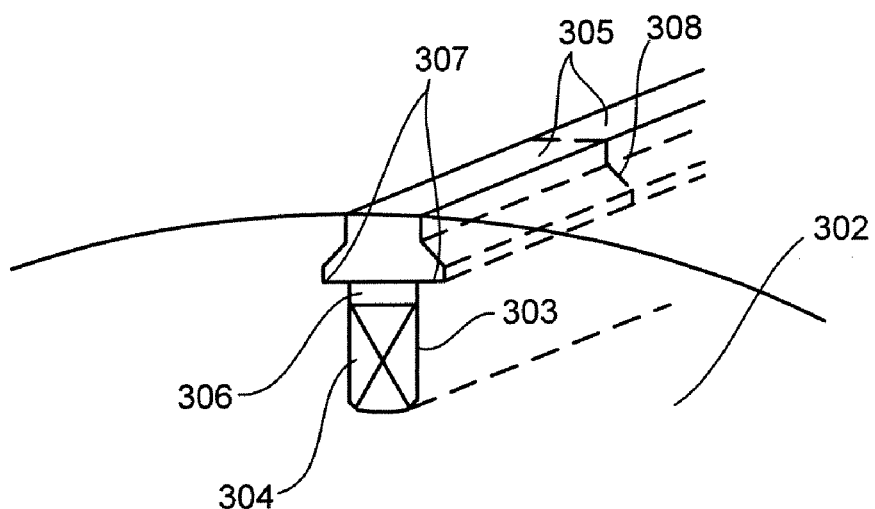
FIG. 10 is a perspective view schematically showing the fabrication state between the slot and the wedge in the rotor shown in FIG. 9.
Figure 11:
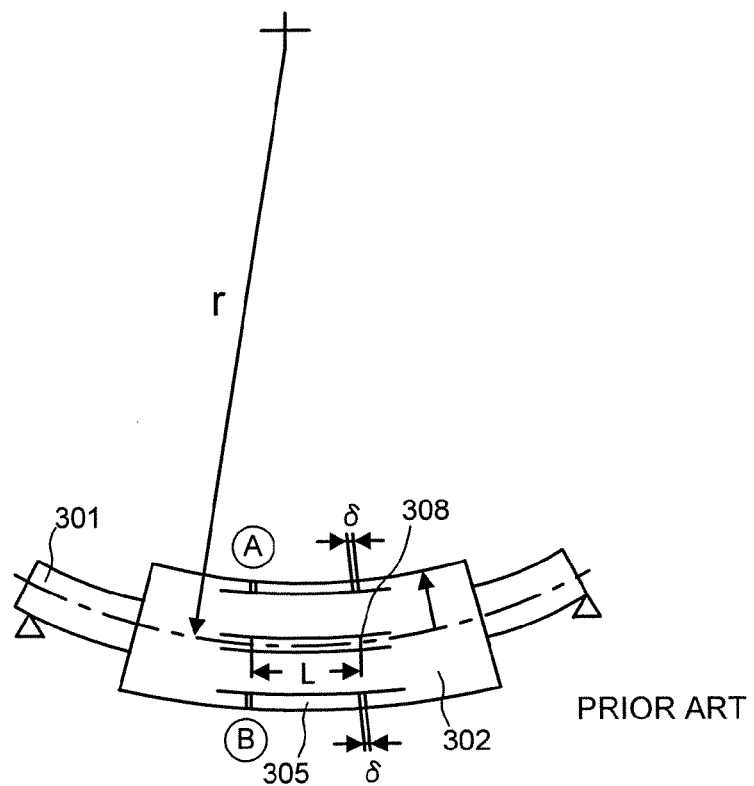
FIG. 11 is a plan view showing the rotor shaft under deformation.
Figure 12:
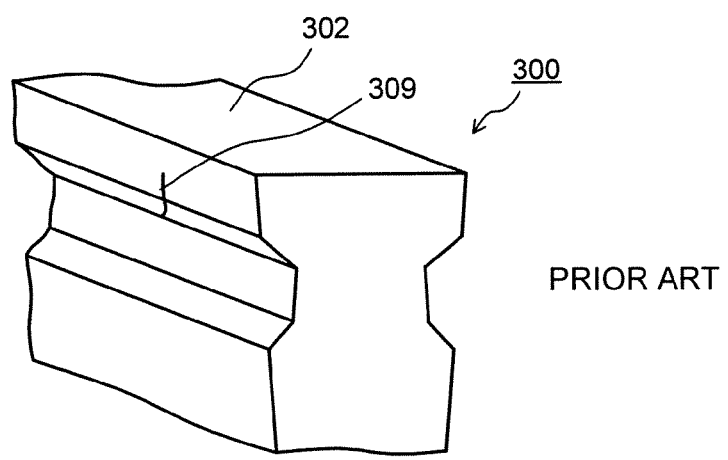
FIG. 12 is a perspective view showing the conventional rotor of the turbine generator with a crack created at the rotor dove tail thereof.
Figure 13:
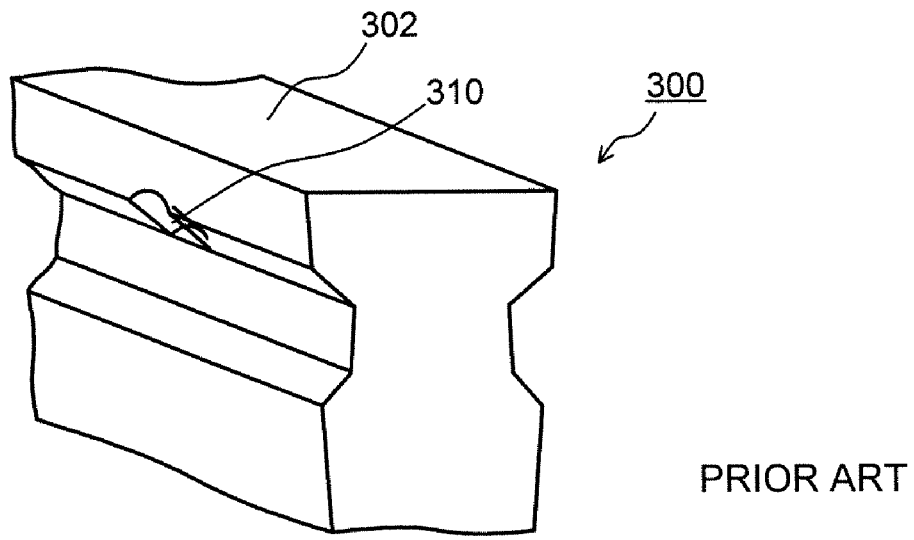
FIG. 13 is a perspective view of the conventional rotor for explaining a conventional removing method for a crack created at the rotor dove tail thereof.
Figure 14:
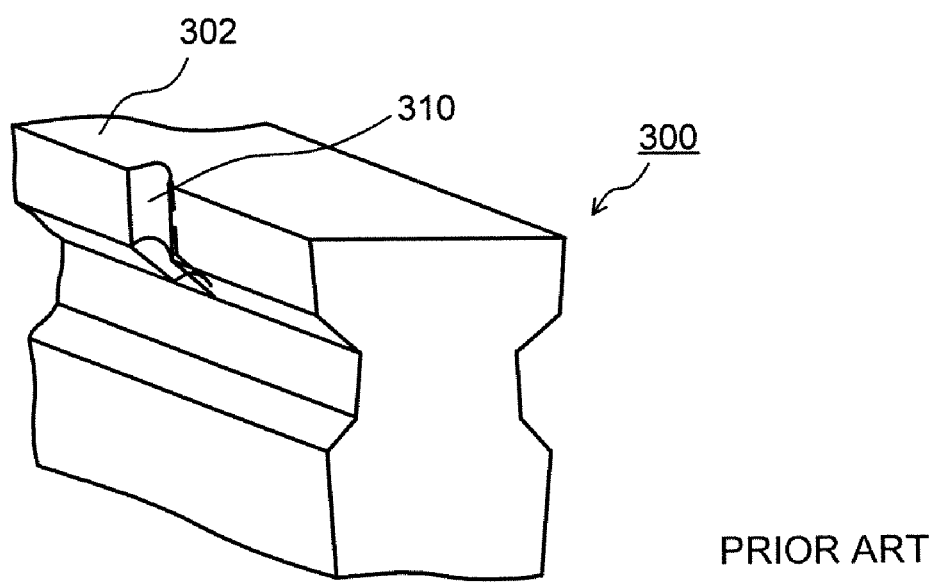
FIG. 14 is also a perspective view of the conventional rotor for explaining a conventional removing method for a crack created at the rotor dove tail thereof.

As shown in FIGS. 5 and 6, the filling members 20 and 30 are adhered into the cut hole 20. In these cases, the filling members 20 and 30 are processed in advance commensurate with the shapes of the cut hole 20. As shown in FIG. 5, when the cut hole 20 is formed at the core portion 11 from the outer surface toward the center axis with maintaining the length "L" of the cut hole 20, the filling member 20 can be adhered into the cut hole 20 from the outer side corresponding to the outer surface. As shown in FIG. 6, in contrast, when the cut hole 20 is formed at the core portion 11 toward the center axis with increasing the length "L" of the cut hole 20 in the side of the center axis, the filling member 40 can be adhered into the cut hole 20 from the side of the cut hole 20 (from the side of the slot 12).

The filling members 30 and 40 may be adhered with the core portion 11 by any means such as melting or engagement using screws.

In view of the weight balance between the filling members 30, 40 and the core portion 11, it is desired that the filling members 30, 40 are made of the same material as the core portion 11 or the almost same relative density material as the core portion 11. The filling members 30, 40 may be made of a material more flexible than the core portion 11 such as Al alloy. In this case, the fretting damage at the contacting surface between the filling members 30, 40 and the core portion 11 can be prevented.

Moreover, in the case that the length "L" of the cut hole 20 along the axial direction is set within 3 to 20 mm, the concave ditches 20d are formed at the side surfaces 20b of the cut hole 20 in the axial direction, and the filling member 50 with a convex parts 50a may be adhered into the thus obtained cut hole 20. In this case, the filling member 50 is adhered into the cut hole 20 under the engagement with the ditches 20d not through melting. Because the convex parts 50a of the filling member 50 are connected in the concave ditches 20d, respectively.

In this way, if the filling member 50 is adhered into the cut hole 20, the weight balance between the core portions 11 with the cut hole 20 and without the cut hole 20 can be maintained. Then, the current flowed in the outer surface of the core portion 11 with the cut hole 20 can be set to the one of the core portion 11 without the cut hole 20. Also, the ventilation resistance on the outer surface of the core portion 11 with the cut hole 20 can be set to the one of the core portion 11 without the cut hole 20.

Although the present invention was described in detail with reference to the above examples, this invention is not limited to the above disclosure and every kind of variation and modification may be made without departing from the scope of the present invention. The present invention relating to the crack removing method can be applied for a normal rotary electrical machine such as an electric motor or an electric generator.

What is claimed is:

1. A method for removing a crack in an electromechanical rotor, comprising:
   providing an electromechanical rotor, the electromechanical rotor having
      a core portion,
      a plurality of slots formed on an outer surface of the core portion along an axial direction of the electromechanical rotor, the slot being configured to receive a coil, and
      a groove formed on both side walls of the slot, the groove being configured to hold a wedge for maintaining the coil in said slot,
      the core portion including a crack developed from a contact surface between the wedge and the slot along a circumferential direction;
   forming a first cut hole by cutting off a portion including the crack from an outer surface of said core portion toward a center axis of the core portion across the crack between adjacent slots along a circumferential direction of the core portion; and
   forming a second cut hole on an edge between a bottom surface of the first cut hole and a side surface of the first cut hole so as to have a given curvature.

2. The removing method as set forth in claim 1, further comprising forming at least one concave ditch at at least one side surface of said first cut hole in said axial direction.

3. The removing method as set forth in claim 2, further comprising forming, into said first cut hole, a filling member with a shape commensurate with a shape of said first cut hole through adhesion under an engagement of a portion of said filling member with said at least one concave ditch form at said at least one side surface of said first cut hole in said axial direction.

4. The removing method as set forth in claim 3, wherein said filling member is made of the same material as said core portion or the almost same relative density material as said core portion.

5. The removing method as set forth in claim 3, wherein said filling member is made of a material more flexible than said core portion.

6. The removing method as set forth in claim 1, wherein a length of said first cut hole along said axial direction is set within 3 to 20 mm on the outer surface of said core portion.

7. The removing method as set forth in claim 1, wherein a length of said first cut hole along said axial direction is set within 1 to 20 mm on the outer surface of said core portion and the curvature radius of said second cut hole is set to 1.5 mm or more.

8. The removing method as set forth in claim 1, further comprising filling the first cut hole with a filling member with a shape commensurate with a shape of said first cut hole and welding the filling member to the core portion.

9. The removing method as set forth in claim 8, wherein said filling member is made of the same material as said core portion or the almost same relative density material as said core portion.

10. The removing method as set forth in claim 8, wherein said filling member is made of a material more flexible than said core portion.

11. The removing method as set forth in claim 1, further comprising filling the first cut hole with a filling member with a shape commensurate with a shape of said first cut hole and fixing the filling member by a screw.

12. The removing method as set forth in claim 11, wherein said filling member is made of the same material as said core portion or the almost same relative density material as said core portion.

13. The removing method as set forth in claim 11, wherein said filling member is made of a material more flexible than said core portion.

* * * * *